Patented Feb. 12, 1924.

1,483,318

UNITED STATES PATENT OFFICE.

RALPH H. SMITH, OF WILTON, NEW YORK, ASSIGNOR TO WILLIAM A. ROBESON, OF SARATOGA SPRINGS, NEW YORK.

COMPOSITION FOR TREATING COAL.

No Drawing.     Application filed January 26, 1922. Serial No. 532,042.

*To all whom it may concern:*

Be it known that I, RALPH H. SMITH, a citizen of the United States of America, residing at Wilton, in the county of Saratoga and State of New York, have invented new and useful Improvements in Compositions for Treating Coal, of which the following is a specification.

The principal objects of the invention are to facilitate the combustion, and to increase the heating efficiency, of coal.

Other objects will appear in connection with the following description.

My new composition in the preferred form consists of an aqueous solution of chlorate of potash, chloride of sodium, permanganate of potash, saltpeter and borax. These are preferably used in the proportions of chlorate of potash 8 pounds, chloride of sodium 87 pounds; permanganate of potash, 5 pounds; saltpeter, 5 pounds and borax 2 pounds.

These ingredients are ground and thoroughly mixed together. The mixture is then dissolved in water in the proportions of approximately 10 ounces of the powdered mixture to 4 gallons of water, the water being preferably hot or boiling. This produces a sufficient quantity of the solution for the treatment of approximately a ton of coal.

The solution thus formed is then sprinkled upon the coal, after which the coal is used as fuel in the usual manner.

It is desirable that the solution be distributed as uniformly as possible upon the coal. I prefer to make the solution in small quantities as needed.

I have stated the approximate proportions of the several ingredients of my composition, but I do not wish to be limited to the proportions stated because these may be varied at will or to adapt the composition to different kinds of coal, without departing from my invention.

For certain purposes of the invention the water may be omitted and the other ingredients mixed in dry form with the coal.

For certain purposes of the invention the chloride of sodium, borax and permanganate of potash may be one or all omitted.

Experiments which I have made indicate that my composition causes a more complete reduction of the slaty matter in the coal, prevents too rapid combustion of the free carbon, increases the heating efficiency of the coal, and reduces the proportion of ash and smoke from the coal.

My composition is adapted for the treatment of anthracite and bituminous coal, coke and other mineral substances used for fuel.

Any desired coloring matter may be added to the composition.

What I claim as new and desire to secure by Letters Patent is:

1. A fuel-treating composition of matter containing chlorate of potash, chloride of sodium and saltpeter.

2. A fuel-treating composition of matter containing chlorate of potash, chloride of sodium and permanganate of potash.

3. A fuel-treating composition of matter containing chlorate of potash, chloride of sodium, permanganate of potash and saltpeter.

4. A fuel-treating composition of matter containing chlorate of potash, saltpeter and borax.

5. A fuel-treating composition of matter containing in approximately the proportions stated, chlorate of potash, 8 pounds; chloride of sodium, 82 pounds; permanganate of potash, 5 pounds; saltpeter, 5 pounds; and borax, 2 pounds.

In testimony whereof, I have hereunto set my hand this 24th day of January, 1922.

RALPH H. SMITH.